（12）United States Patent
Gomez et al.

(10) Patent No.: US 9,497,092 B2
(45) Date of Patent: Nov. 15, 2016

(54) REMOTE DEVICE MANAGEMENT INTERFACE

(75) Inventors: Garrison Gomez, Marietta, GA (US);
Daniel Yeakley, Monroe, NC (US);
Michael Doren, Cicero, NY (US);
Daniel French, Charlotte, NC (US);
David Mangicaro, Syracuse, NY (US);
Thomas Koziol, Camillus, NY (US);
Adam Haile, Lake Wylie, SC (US);
Aldo Caballero, Charlotte, NC (US)

(73) Assignee: Hand Held Products, Inc., Fort Hill, SC (US)

( * ) Notice: Subject to any disclaimer, the term of this patent is extended or adjusted under 35 U.S.C. 154(b) by 279 days.

(21) Appl. No.: 12/961,627

(22) Filed: Dec. 7, 2010

(65) Prior Publication Data

US 2011/0138310 A1    Jun. 9, 2011

Related U.S. Application Data

(60) Provisional application No. 61/267,641, filed on Dec. 8, 2009.

(51) Int. Cl.
*G06F 3/048* (2013.01)
*H04L 12/26* (2006.01)
(Continued)

(52) U.S. Cl.
CPC ......... *H04L 43/0817* (2013.01); *G06F 3/0486* (2013.01); *G06F 3/04817* (2013.01); *G06F 3/04842* (2013.01); *H04L 41/082* (2013.01); *H04L 41/0893* (2013.01); *H04L 41/147* (2013.01); *H04L 41/22* (2013.01);
(Continued)

(58) Field of Classification Search
CPC ... H04L 41/22; H04L 41/0893; H04L 67/36;
G06F 11/327; H04W 4/00–4/003; H04W 4/02–4/028; H04W 4/06–4/10; H04W 24/00–24/10; H04W 64/00–64/006
USPC .......................... 715/200–867; 717/168–178;
340/1.1–999; 345/1.1–572; 455/1–899;
707/600–899; 709/200–253
See application file for complete search history.

(56) References Cited

U.S. PATENT DOCUMENTS 5,109,486 A    4/1992  Seymour
5,261,044 A    11/1993 Dev et al.
(Continued)

OTHER PUBLICATIONS

Author unlisted, "iPass Policy Orchestration Automates Continuous Endpoint Security", Redwood Shores, California, Nov. 15, 2004, iPass Inc., press release found at http://www.ipass.com/pressroom/pressroom_printfriendly.html?rid=132, pp. 1 through 3, printed Feb. 26, 2007.

(Continued)

*Primary Examiner* — William Bashore
*Assistant Examiner* — Linda Huynh
(74) *Attorney, Agent, or Firm* — Additon, Higgins & Pendleton, P.A.

(57) ABSTRACT

A network for remotely managing a plurality of remote devices that are each individually configurable to have selected operating characteristics includes a server connected to the network and to the plurality of remote devices, and a display coupled to a computer which is connected to the network. Also included are means for assigning a common icon to each remote device of the same type and displaying the icons on the server display, and means for coloring each icon to indicate a current configuration status of each remote device and for displaying the color on the icon on the display.

13 Claims, 11 Drawing Sheets

(51) Int. Cl.
*G06F 3/0484* (2013.01)
*G06F 3/0486* (2013.01)
*G06F 3/0481* (2013.01)
*H04L 29/08* (2006.01)
*H04L 12/24* (2006.01)

(52) U.S. Cl.
CPC .......... *H04L 67/34* (2013.01); *H04L 41/0631* (2013.01); *H04L 43/16* (2013.01)

(56) References Cited

U.S. PATENT DOCUMENTS

| | | | | |
|---|---|---|---|---|
| 5,402,316 | A | 3/1995 | Volz et al. | |
| 5,463,742 | A | 10/1995 | Kobayashi | |
| 5,504,921 | A | 4/1996 | Dev et al. | |
| 5,546,145 | A | 8/1996 | Bernardi et al. | |
| 5,552,959 | A | 9/1996 | Penniman et al. | |
| 5,579,001 | A | 11/1996 | Dempsey et al. | |
| 5,579,529 | A | 11/1996 | Terrell et al. | |
| 5,579,775 | A | 12/1996 | Dempsey et al. | |
| 5,587,560 | A | 12/1996 | Crooks et al. | |
| 5,615,625 | A | 4/1997 | Cassidy et al. | |
| 5,640,953 | A | 6/1997 | Bishop et al. | |
| 5,655,081 | A | 8/1997 | Bonnell et al. | |
| 5,687,734 | A | 11/1997 | Dempsey et al. | |
| 5,724,509 | A | 3/1998 | Starkweather et al. | |
| 5,742,286 | A * | 4/1998 | Kung ................ | G06F 3/0486 715/733 |
| 5,752,917 | A | 5/1998 | Fuchs | |
| 5,774,793 | A | 6/1998 | Cooper et al. | |
| 5,793,967 | A | 8/1998 | Simciak et al. | |
| 5,798,951 | A | 8/1998 | Cho et al. | |
| 5,805,442 | A | 9/1998 | Crater et al. | |
| 5,815,735 | A | 9/1998 | Baker | |
| 5,819,110 | A | 10/1998 | Motoyama | |
| 5,825,617 | A | 10/1998 | Kochis et al. | |
| 5,835,733 | A | 11/1998 | Walsh et al. | |
| 5,848,253 | A | 12/1998 | Walsh et al. | |
| 5,862,349 | A | 1/1999 | Cho et al. | |
| 5,867,714 | A | 2/1999 | Todd et al. | |
| 5,875,312 | A | 2/1999 | Walsh et al. | |
| 5,878,256 | A | 3/1999 | Bealkowski et al. | |
| 5,889,964 | A | 3/1999 | Cho et al. | |
| 5,904,727 | A * | 5/1999 | Prabhakaran ................ | 701/454 |
| 5,921,459 | A | 7/1999 | Heraly et al. | |
| 5,931,909 | A | 8/1999 | Taylor | |
| 5,935,244 | A | 8/1999 | Swamy et al. | |
| 5,941,965 | A | 8/1999 | Moroz et al. | |
| 5,961,337 | A | 10/1999 | Kordes | |
| 5,978,591 | A | 11/1999 | Bartholomew et al. | |
| 6,032,202 | A | 2/2000 | Lea et al. | |
| 6,037,788 | A | 3/2000 | Krajec et al. | |
| 6,049,454 | A | 4/2000 | Howell et al. | |
| 6,070,012 | A | 5/2000 | Eitner et al. | |
| 6,085,244 | A | 7/2000 | Wookey | |
| 6,088,752 | A | 7/2000 | Ahem | |
| 6,091,602 | A | 7/2000 | Helot | |
| 6,098,097 | A | 8/2000 | Dean et al. | |
| 6,108,717 | A | 8/2000 | Kimura et al. | |
| 6,109,039 | A | 8/2000 | Hougham et al. | |
| 6,142,593 | A | 11/2000 | Kim et al. | |
| 6,151,643 | A | 11/2000 | Cheng et al. | |
| 6,158,430 | A | 12/2000 | Pfeiffer et al. | |
| 6,160,719 | A | 12/2000 | May et al. | |
| 6,161,133 | A | 12/2000 | Kikinis | |
| 6,171,559 | B1 | 1/2001 | Sanders et al. | |
| 6,188,572 | B1 | 2/2001 | Liao et al. | |
| 6,195,265 | B1 | 2/2001 | Choi et al. | |
| 6,199,108 | B1 | 3/2001 | Casey et al. | |
| 6,202,209 | B1 | 3/2001 | Bartholomew et al. | |
| 6,226,739 | B1 | 5/2001 | Eagle | |
| 6,240,297 | B1 | 5/2001 | Jadoul et al. | |
| 6,247,074 | B1 | 6/2001 | Shin et al. | |
| 6,256,691 | B1 | 7/2001 | Moroz et al. | |
| 6,267,475 | B1 | 7/2001 | Lee et al. | |
| 6,279,059 | B1 | 8/2001 | Ludtke et al. | |
| 6,279,154 | B1 | 8/2001 | Davis | |
| 6,285,911 | B1 | 9/2001 | Watts, Jr. et al. | |
| 6,297,963 | B1 | 10/2001 | Fogle | |
| 6,301,106 | B1 | 10/2001 | Helot et al. | |
| 6,311,321 | B1 | 10/2001 | Agnihotri et al. | |
| 6,324,692 | B1 | 11/2001 | Fiske | |
| 6,330,597 | B2 | 12/2001 | Collin et al. | |
| 6,339,745 | B1 | 1/2002 | Novik | |
| 6,341,274 | B1 | 1/2002 | Leon | |
| 6,341,320 | B1 | 1/2002 | Watts, Jr. et al. | |
| 6,360,362 | B1 | 3/2002 | Fichtner et al. | |
| 6,378,128 | B1 | 4/2002 | Edelstein et al. | |
| 6,407,335 | B1 | 6/2002 | Franklin-Lees et al. | |
| 6,407,915 | B1 | 6/2002 | Derocher et al. | |
| 6,425,126 | B1 | 7/2002 | Branson et al. | |
| 6,442,639 | B1 | 8/2002 | McElhattan et al. | |
| 6,452,325 | B1 | 9/2002 | Dupont | |
| 6,456,306 | B1 * | 9/2002 | Chin et al. ................ | 715/810 |
| 6,457,076 | B1 | 9/2002 | Cheng et al. | |
| 6,461,181 | B1 | 10/2002 | Goh et al. | |
| 6,467,088 | B1 | 10/2002 | alSafadi et al. | |
| 6,477,588 | B1 | 11/2002 | Yerazunis et al. | |
| 6,484,315 | B1 | 11/2002 | Ziese | |
| 6,489,932 | B1 | 12/2002 | Chitturi et al. | |
| 6,505,121 | B1 | 1/2003 | Russell | |
| 6,506,009 | B1 | 1/2003 | Nulman et al. | |
| 6,511,031 | B2 | 1/2003 | Lin | |
| 6,519,143 | B1 | 2/2003 | Goko et al. | |
| 6,539,358 | B1 | 3/2003 | Coon et al. | |
| 6,542,943 | B2 | 4/2003 | Cheng et al. | |
| 6,558,049 | B1 | 5/2003 | Shin | |
| 6,560,643 | B1 | 5/2003 | Shepherd et al. | |
| 6,584,336 | B1 | 6/2003 | Ali et al. | |
| 6,584,499 | B1 | 6/2003 | Jantz et al. | |
| 6,587,874 | B1 | 7/2003 | Golla et al. | |
| 6,593,528 | B2 | 7/2003 | Franklin-Lees et al. | |
| 6,594,534 | B1 | 7/2003 | Crowell | |
| 6,606,678 | B1 | 8/2003 | Nakamura et al. | |
| 6,614,979 | B2 | 9/2003 | Bourdeau et al. | |
| 6,615,405 | B1 | 9/2003 | Goldman et al. | |
| 6,628,517 | B1 | 9/2003 | Helot et al. | |
| 6,633,482 | B2 | 10/2003 | Rode | |
| 6,658,659 | B2 | 12/2003 | Hiller et al. | |
| 6,668,296 | B1 | 12/2003 | Dougherty et al. | |
| 6,683,786 | B2 | 1/2004 | Yin et al. | |
| 6,684,241 | B1 | 1/2004 | Sandick et al. | |
| 6,697,032 | B2 | 2/2004 | Chitturi et al. | |
| 6,722,192 | B2 | 4/2004 | Benedict et al. | |
| 6,725,260 | B1 | 4/2004 | Philyaw | |
| 6,725,281 | B1 | 4/2004 | Zintel et al. | |
| 6,728,956 | B2 | 4/2004 | Ono et al. | |
| 6,742,025 | B2 | 5/2004 | Jennery et al. | |
| 6,751,681 | B2 | 6/2004 | Torli et al. | |
| 6,754,723 | B2 | 6/2004 | Kato et al. | |
| 6,760,761 | B1 | 7/2004 | Sciacca | |
| 6,763,403 | B2 | 7/2004 | Cheng et al. | |
| 6,766,175 | B2 | 7/2004 | Uchiyama | |
| 6,766,956 | B1 | 7/2004 | Boylan, III et al. | |
| 6,770,028 | B1 | 8/2004 | Ali et al. | |
| 6,772,264 | B1 | 8/2004 | Dayan et al. | |
| 6,778,824 | B2 | 8/2004 | Wonak et al. | |
| 6,779,068 | B2 | 8/2004 | Kim et al. | |
| 6,784,855 | B2 | 8/2004 | Matthews et al. | |
| 6,806,813 | B1 | 10/2004 | Cheng et al. | |
| 6,832,082 | B1 | 12/2004 | Ramaswamy et al. | |
| 6,832,373 | B2 | 12/2004 | O'Neill | |
| 6,833,787 | B1 | 12/2004 | Levi | |
| 6,833,989 | B2 | 12/2004 | Helot et al. | |
| 6,850,158 | B1 | 2/2005 | Williams | |
| 6,854,112 | B2 | 2/2005 | Crespo et al. | |
| 6,857,013 | B2 | 2/2005 | Ramberg et al. | |
| 6,863,210 | B2 | 3/2005 | Becker et al. | |
| 6,864,891 | B2 | 3/2005 | Myers | |
| 6,868,468 | B2 | 3/2005 | Boz et al. | |
| 6,886,104 | B1 | 4/2005 | McClurg et al. | |
| 6,889,263 | B2 | 5/2005 | Motoyama | |
| 6,895,261 | B1 | 5/2005 | Palamides | |
| 6,895,445 | B2 | 5/2005 | Ying et al. | |

(56) References Cited

U.S. PATENT DOCUMENTS

| | | | |
|---|---|---|---|
| 6,898,080 B2 | 5/2005 | Yin et al. |
| 6,904,457 B2 | 6/2005 | Goodman |
| 6,907,603 B2 | 6/2005 | Scott |
| 6,915,514 B1 | 7/2005 | Machida et al. |
| 6,920,631 B2 | 7/2005 | Delo |
| 6,928,493 B2 | 8/2005 | Motoyama |
| 6,944,854 B2 | 9/2005 | Kehne et al. |
| 6,944,858 B2 | 9/2005 | Luu |
| 6,947,612 B2 | 9/2005 | Helms et al. |
| 6,954,142 B2 | 10/2005 | Lieberman et al. |
| 6,955,517 B2 | 10/2005 | Nulman et al. |
| 6,959,172 B2 | 10/2005 | Becker et al. |
| 6,961,586 B2 | 11/2005 | Barbosa et al. |
| 6,966,058 B2 | 11/2005 | Earl et al. |
| 6,968,550 B2 | 11/2005 | Branson et al. |
| 6,970,952 B2 | 11/2005 | Motoyama |
| 6,973,799 B2 | 12/2005 | Kuehl et al. |
| 6,976,062 B1 | 12/2005 | Denby et al. |
| 6,981,086 B2 | 12/2005 | Wetzel et al. |
| 6,985,945 B2 | 1/2006 | Farhat et al. |
| 6,987,988 B2 | 1/2006 | Uchiyama |
| 6,990,549 B2 | 1/2006 | Main et al. |
| 6,990,660 B2 | 1/2006 | Moshir et al. |
| 6,993,615 B2 | 1/2006 | Falcon |
| 6,993,760 B2 | 1/2006 | Peev et al. |
| 6,996,634 B1 | 2/2006 | Herrod et al. |
| 6,999,898 B2 | 2/2006 | King et al. |
| 7,000,228 B2 | 2/2006 | Mortazavi |
| 7,003,560 B1 | 2/2006 | Mullen et al. |
| 7,013,331 B2 | 3/2006 | Das |
| 7,020,571 B2 | 3/2006 | Lee et al. |
| 7,024,189 B2 | 4/2006 | Wonak et al. |
| 7,039,688 B2 | 5/2006 | Matsuda et al. |
| 7,043,537 B1 | 5/2006 | Pratt |
| 7,054,423 B2 | 5/2006 | Nebiker et al. |
| 7,054,977 B2 | 5/2006 | Kadambi et al. |
| 7,069,006 B2 | 6/2006 | Wonak |
| 7,072,675 B1 | 7/2006 | Kanakubo |
| 7,076,536 B2 | 7/2006 | Chiloyan et al. |
| 7,080,371 B1 | 7/2006 | Arnaiz et al. |
| 7,085,805 B1 | 8/2006 | Ruberg et al. |
| 7,085,824 B2 | 8/2006 | Forth et al. |
| 7,086,049 B2 | 8/2006 | Goodman |
| 7,089,551 B2 | 8/2006 | Fordemwalt et al. |
| 7,099,152 B2 | 8/2006 | Gasbarro et al. |
| 7,100,271 B2 | 9/2006 | Bauiler et al. |
| 7,107,380 B1 | 9/2006 | Mohan |
| 7,111,055 B2 | 9/2006 | Falkner |
| 7,114,021 B2 | 9/2006 | Seshadri |
| 7,117,239 B1 | 10/2006 | Hansen |
| 7,117,286 B2 | 10/2006 | Falcon |
| 7,130,896 B2 | 10/2006 | Engel et al. |
| 7,133,939 B1 | 11/2006 | Desal et al. |
| 7,149,792 B1 | 12/2006 | Hansen |
| 7,159,016 B2 | 1/2007 | Baker |
| 7,185,014 B1 | 2/2007 | Hansen |
| 7,188,160 B2 | 3/2007 | Champagne et al. |
| 7,188,171 B2 | 3/2007 | Srinivasan et al. |
| 7,191,435 B2 | 3/2007 | Lau et al. |
| 7,194,526 B2 | 3/2007 | Kanemitsu et al. |
| 7,216,343 B2 | 5/2007 | Das et al. |
| 7,272,711 B2 | 9/2007 | Suda et al. |
| 7,289,995 B2 | 10/2007 | Motoyama et al. |
| 7,290,258 B2 | 10/2007 | Steeb et al. |
| 7,316,013 B2 | 1/2008 | Kawano et al. |
| 7,363,359 B1* | 4/2008 | Tripathy et al. ............... 709/223 |
| 7,367,514 B2 | 5/2008 | Soule, III et al. |
| 7,375,654 B2* | 5/2008 | Culpepper et al. ...... 340/995.15 |
| 7,487,114 B2 | 2/2009 | Florance et al. |
| 7,539,862 B2 | 5/2009 | Edgett et al. |
| 7,564,376 B2* | 7/2009 | Jang ................. G08G 1/096716 340/905 |
| 7,857,222 B2 | 12/2010 | Kosecki et al. |
| 7,979,854 B1* | 7/2011 | Borole et al. ................. 717/172 |
| 2001/0042112 A1 | 11/2001 | Slivka et al. |
| 2002/0073304 A1 | 6/2002 | Marsh et al. |
| 2002/0083160 A1 | 6/2002 | Middleton |
| 2002/0086703 A1 | 7/2002 | Dimenstein et al. |
| 2002/0087392 A1 | 7/2002 | Stevens |
| 2002/0087668 A1 | 7/2002 | San Martin et al. |
| 2002/0087960 A1 | 7/2002 | Hisatake |
| 2002/0092008 A1 | 7/2002 | Kehne et al. |
| 2002/0092013 A1 | 7/2002 | Delo |
| 2002/0094208 A1 | 7/2002 | Palumbo |
| 2002/0095484 A1 | 7/2002 | Pagani et al. |
| 2002/0100036 A1 | 7/2002 | Moshir et al. |
| 2002/0103900 A1* | 8/2002 | Cornelius ............ G06F 11/0715 709/224 |
| 2002/0109665 A1 | 8/2002 | Matthews et al. |
| 2002/0129350 A1 | 9/2002 | Wang et al. |
| 2002/0129355 A1 | 9/2002 | Velten et al. |
| 2002/0147974 A1 | 10/2002 | Wookey |
| 2002/0174223 A1* | 11/2002 | Childers ................ H04L 69/329 709/224 |
| 2002/0184349 A1 | 12/2002 | Manukyan |
| 2002/0184350 A1 | 12/2002 | Chen |
| 2002/0187024 A1 | 12/2002 | Nulman |
| 2002/0191940 A1 | 12/2002 | Bourdeau |
| 2002/0198969 A1 | 12/2002 | Engel et al. |
| 2003/0018694 A1 | 1/2003 | Chen et al. |
| 2003/0031539 A1 | 2/2003 | Nulman et al. |
| 2003/0046675 A1 | 3/2003 | Cheng et al. |
| 2003/0051235 A1 | 3/2003 | Simpson |
| 2003/0059022 A1 | 3/2003 | Nebiker et al. |
| 2003/0084436 A1 | 5/2003 | Berger et al. |
| 2003/0088651 A1 | 5/2003 | Wilson |
| 2003/0097427 A1 | 5/2003 | Parry |
| 2003/0101021 A1* | 5/2003 | Shah et al. ..................... 702/186 |
| 2003/0111245 A1 | 6/2003 | Haggerty |
| 2003/0154471 A1 | 8/2003 | Teachman et al. |
| 2003/0188306 A1 | 10/2003 | Harris et al. |
| 2003/0198015 A1 | 10/2003 | Vogt |
| 2003/0217357 A1 | 11/2003 | Parry |
| 2003/0217358 A1 | 11/2003 | Thurston et al. |
| 2003/0221190 A1 | 11/2003 | Deshpande et al. |
| 2003/0225939 A1 | 12/2003 | Ying et al. |
| 2003/0231211 A1* | 12/2003 | Shah et al. ..................... 345/771 |
| 2004/0002943 A1 | 1/2004 | Merrill et al. |
| 2004/0015949 A1 | 1/2004 | Taylor |
| 2004/0020974 A1 | 2/2004 | Becker et al. |
| 2004/0024933 A1 | 2/2004 | Billington et al. |
| 2004/0049233 A1 | 3/2004 | Edwards |
| 2004/0050247 A1 | 3/2004 | Topping |
| 2004/0083471 A1 | 4/2004 | Nam et al. |
| 2004/0098571 A1 | 5/2004 | Falcon |
| 2004/0103172 A1 | 5/2004 | Chen et al. |
| 2004/0123281 A1 | 6/2004 | Olrik et al. |
| 2004/0127210 A1 | 7/2004 | Shostak |
| 2004/0139757 A1 | 7/2004 | Kuehl et al. |
| 2004/0143032 A1 | 7/2004 | Auschra et al. |
| 2004/0148600 A1 | 7/2004 | Hoshino |
| 2004/0154014 A1 | 8/2004 | Bunger |
| 2004/0168167 A1 | 8/2004 | Ono |
| 2004/0177380 A1 | 9/2004 | Hamel et al. |
| 2004/0181593 A1 | 9/2004 | Kanojia et al. |
| 2004/0192329 A1 | 9/2004 | Barbosa et al. |
| 2004/0199615 A1 | 10/2004 | Philyaw |
| 2004/0205709 A1 | 10/2004 | Hiltgen et al. |
| 2004/0206821 A1* | 10/2004 | Longacre, Jr. ...... G06K 7/10851 235/462.07 |
| 2004/0210897 A1 | 10/2004 | Brockway et al. |
| 2004/0212822 A1 | 10/2004 | Schinner |
| 2004/0216099 A1 | 10/2004 | Okita et al. |
| 2004/0235532 A1 | 11/2004 | Matthews et al. |
| 2004/0243991 A1 | 12/2004 | Gustafson et al. |
| 2004/0243995 A1 | 12/2004 | Sheehy |
| 2004/0255023 A1 | 12/2004 | Motoyama et al. |
| 2004/0268340 A1 | 12/2004 | Steeb et al. |
| 2005/0044544 A1 | 2/2005 | Slivka et al. |
| 2005/0050538 A1 | 3/2005 | Kawamata et al. |
| 2005/0052156 A1 | 3/2005 | Liebenow |
| 2005/0060862 A1 | 3/2005 | Baulier |
| 2005/0065822 A1 | 3/2005 | Ying et al. |
| 2005/0086328 A1 | 4/2005 | Landram et al. |

(56) References Cited

U.S. PATENT DOCUMENTS

| | | |
|---|---|---|
| 2005/0093821 A1 | 5/2005 | Massie et al. |
| 2005/0097543 A1 | 5/2005 | Hirayama |
| 2005/0097544 A1 | 5/2005 | Kim |
| 2005/0108700 A1 | 5/2005 | Chen et al. |
| 2005/0132348 A1 | 6/2005 | Meulemans et al. |
| 2005/0132349 A1 | 6/2005 | Roberts et al. |
| 2005/0132350 A1 | 6/2005 | Markley et al. |
| 2005/0132351 A1 | 6/2005 | Randall et al. |
| 2005/0144612 A1 | 6/2005 | Wang et al. |
| 2005/0144614 A1 | 6/2005 | Moslander et al. |
| 2005/0156715 A1* | 7/2005 | Zou ............... B60R 25/1025 340/426.19 |
| 2005/0159847 A1 | 7/2005 | Shah et al. |
| 2005/0204036 A1 | 9/2005 | Farhat et al. |
| 2005/0204353 A1 | 9/2005 | Ji |
| 2005/0210458 A1 | 9/2005 | Moriyama et al. |
| 2005/0210459 A1 | 9/2005 | Henderson et al. |
| 2005/0210466 A1 | 9/2005 | Carter et al. |
| 2005/0223372 A1 | 10/2005 | Borchers |
| 2005/0223373 A1 | 10/2005 | Gage et al. |
| 2005/0229171 A1 | 10/2005 | Henry et al. |
| 2005/0235076 A1 | 10/2005 | Winarski et al. |
| 2005/0246703 A1 | 11/2005 | Ahonen |
| 2005/0251799 A1 | 11/2005 | Wang |
| 2005/0254776 A1 | 11/2005 | Morrison et al. |
| 2005/0257205 A1 | 11/2005 | Costea et al. |
| 2005/0257209 A1 | 11/2005 | Adams et al. |
| 2005/0273229 A1 | 12/2005 | Steinmeier et al. |
| 2005/0278001 A1 | 12/2005 | Qin et al. |
| 2006/0010437 A1 | 1/2006 | Marolia |
| 2006/0013646 A1 | 1/2006 | Baulier et al. |
| 2006/0019679 A1* | 1/2006 | Rappaport ............ H04W 64/00 455/456.5 |
| 2006/0029489 A1 | 2/2006 | Nulman et al. |
| 2006/0031617 A1 | 2/2006 | Falcon |
| 2006/0031828 A1 | 2/2006 | Won et al. |
| 2006/0041881 A1 | 2/2006 | Adkasthala |
| 2006/0049677 A1 | 3/2006 | Lawrence et al. |
| 2006/0069813 A1 | 3/2006 | Biamonte et al. |
| 2006/0070055 A1 | 3/2006 | Hodder et al. |
| 2006/0082965 A1 | 4/2006 | Walker et al. |
| 2006/0099971 A1* | 5/2006 | Staton ................. G08C 17/00 455/456.6 |
| 2006/0106965 A1 | 5/2006 | Falcon |
| 2006/0130037 A1 | 6/2006 | Mackay |
| 2006/0132964 A1 | 6/2006 | Lau et al. |
| 2006/0136893 A1 | 6/2006 | Blossom et al. |
| 2006/0142129 A1 | 6/2006 | Siaperas |
| 2006/0149321 A1 | 7/2006 | Merry et al. |
| 2006/0149322 A1 | 7/2006 | Merry et al. |
| 2006/0149323 A1 | 7/2006 | Merry et al. |
| 2006/0150177 A1 | 7/2006 | Liu et al. |
| 2006/0156302 A1 | 7/2006 | Yamamoto et al. |
| 2006/0168578 A1 | 7/2006 | Vorlicek |
| 2006/0168581 A1 | 7/2006 | Goger et al. |
| 2006/0172873 A1 | 8/2006 | Beard |
| 2006/0179431 A1 | 8/2006 | Devanathan et al. |
| 2006/0200812 A1 | 9/2006 | Mizutani et al. |
| 2006/0206888 A1 | 9/2006 | Mavrinac et al. |
| 2006/0218545 A1 | 9/2006 | Taguchi |
| 2006/0236518 A1 | 10/2006 | Baulier |
| 2006/0238364 A1* | 10/2006 | Keefe ................. G05B 23/02 340/646 |
| 2006/0238384 A1 | 10/2006 | Hess et al. |
| 2006/0248522 A1 | 11/2006 | Lakshminarayanan et al. |
| 2006/0248524 A1 | 11/2006 | Seely |
| 2006/0265446 A1 | 11/2006 | Elgressy et al. |
| 2006/0277299 A1* | 12/2006 | Baekelmans ....... G06F 11/0709 709/224 |
| 2007/0006207 A1 | 1/2007 | Appaji |
| 2007/0006213 A1 | 1/2007 | Shahidzadeh et al. |
| 2007/0006214 A1 | 1/2007 | Dubal et al. |
| 2007/0038990 A1 | 2/2007 | White et al. |
| 2007/0055969 A1 | 3/2007 | Yang |
| 2007/0055970 A1 | 3/2007 | Sakuda et al. |
| 2007/0074201 A1 | 3/2007 | Lee |
| 2007/0083630 A1 | 4/2007 | Roth et al. |
| 2007/0093243 A1* | 4/2007 | Kapadekar et al. .......... 455/419 |
| 2007/0169073 A1 | 7/2007 | O'Neill et al. |
| 2007/0169089 A1 | 7/2007 | Bantz et al. |
| 2007/0169090 A1 | 7/2007 | Kang |
| 2007/0169092 A1 | 7/2007 | Lee |
| 2007/0169093 A1 | 7/2007 | Logan et al. |
| 2007/0174834 A1 | 7/2007 | Purkeypile et al. |
| 2007/0220505 A1 | 9/2007 | Bukovec et al. |
| 2007/0234331 A1 | 10/2007 | Schow et al. |
| 2007/0245333 A1 | 10/2007 | Ferlitsch |
| 2008/0070495 A1* | 3/2008 | Stricklen et al. ............ 455/3.01 |
| 2008/0185432 A1 | 8/2008 | Caballero et al. |
| 2008/0209411 A1 | 8/2008 | Koziol et al. |
| 2009/0019152 A1* | 1/2009 | Huang .................. H04L 67/125 709/224 |
| 2009/0030556 A1* | 1/2009 | Castelli ................ G06Q 10/063 700/286 |
| 2009/0044003 A1 | 2/2009 | Berthiaume et al. |
| 2009/0300179 A1* | 12/2009 | Srinivasan .............. H04L 69/28 709/225 |
| 2010/0087188 A1* | 4/2010 | Griff ................... H04L 12/2602 455/424 |
| 2010/0131455 A1* | 5/2010 | Logan et al. ................. 707/602 |
| 2012/0221954 A1* | 8/2012 | Tanaka ......................... 715/736 |

OTHER PUBLICATIONS

Author unlisted, "iPass makes Mobile Device Management Easier and More Cost-Effective With New, Web-Based Version of Endpoint Policy Management", Redwood Shores, California, May 15, 2006, iPass Inc., press release found at http://www.ipass.com/pressroom/pressroom_printfriendly.html?rid=204, pp. 1 through 2, printed Feb. 26, 2007.

Author unlisted, "iPass Solves End-User Compliance Issues With New Solution for Trusted Mobility", Redwood Shores, California, Jun. 27, 2005, iPass Inc., press release found at http://www.ipass.com/pressroom/pressroom_printfriendly.html?rid=163, pp. 1 through 3, printed Feb. 26, 2007.

Hand Held Products Partners with SOTI on Remote Device Management and Security, article found at http://www.handheld.com/Site.aspx/na/en/news_events/news_listing/listing/article/?article . . . , pp. 11 through 2, printed Mar. 31, 2009.

Author unlisted, Honeywell, NaurTech, CETerm, "Industrial Browser & Terminal Emulation", pp. 1 through 2.

Author unlisted, Honeywell, SOTi.net, MobiControl v5, Honeywell Imaging and Mobility, 700 Visions Dr., Skaneateles Falls, NY 13153-0208, found at www.honeywell.com/aidc, pp. 1 and 2.

First Chinese Office Action in Patent Application 201010601656.0 dated Sep. 5, 2014; Original and English translation provided. 22 pages.

Second Chinese Office Action in related Application No. 201010601656.0, dated May 14, 2015, 17 pages, English translation provided.

Third Chinese Office Action in related Application No. 201010601656.0, dated Dec. 31, 2015, 18 pages, English translation provided.

Fourth Chinese Office Action in related application CN201010601656.0. Dated May 3, 2016, English Machine Translation provided, 26 pages [References have been previously cited and considered].

* cited by examiner

REMOTE DEVICE MANAGEMENT INTERFACE

FIELD OF THE INVENTION

This invention relates to the management of remote devices such as portable data terminals (PDTs), and more particularly to an interface for managing the remote devices.

BACKGROUND OF THE INVENTION

Remote devices, such as portable data terminals (PDTs), portable data assistants (PDAs), and other devices used for automatic identification and data collection (AIDC) generally provide data at remote locations back to a central office. Sometimes these devices have the ability to monitor the operation of the device and to provide device status information to the central office. Such a remote device is described in U.S. Patent Publication No. 2008/0185432 A1 to Caballo et al. which is hereby incorporated by reference.

The remote devices can have the ability to have their configuration changed or to have a new application program installed while away from the central office. U.S. Patent Publication No. 2009/0044003 A1 to Berthiaume et al. teaches such a method, and is hereby incorporated by reference.

The remote devices can be managed by Remote Device Management (RDM) systems that allow an RDM user to manage the remote devices including updating configurations and device software, and to track problems which may be common to several devices, and provide fixes for these problems where feasible.

However, some RDM systems accumulate vast amounts of diagnostic and performance data. Organizing the data in a clear, concise, meaningful, and intuitive way on the graphical user interface of a computer display is a problem. Either too much data is presented so as to be cluttered and confusing, or the user has to navigate through multiple, sometimes non-intuitive, dialogs to access desired information.

BRIEF DESCRIPTION OF THE DRAWINGS

FIGS. 2A-2I are user interface screens showing displayed information, screen configuration options, and control commands for monitoring and controlling the configuration of the remote devices shown in FIG. 1.

Figure 1:
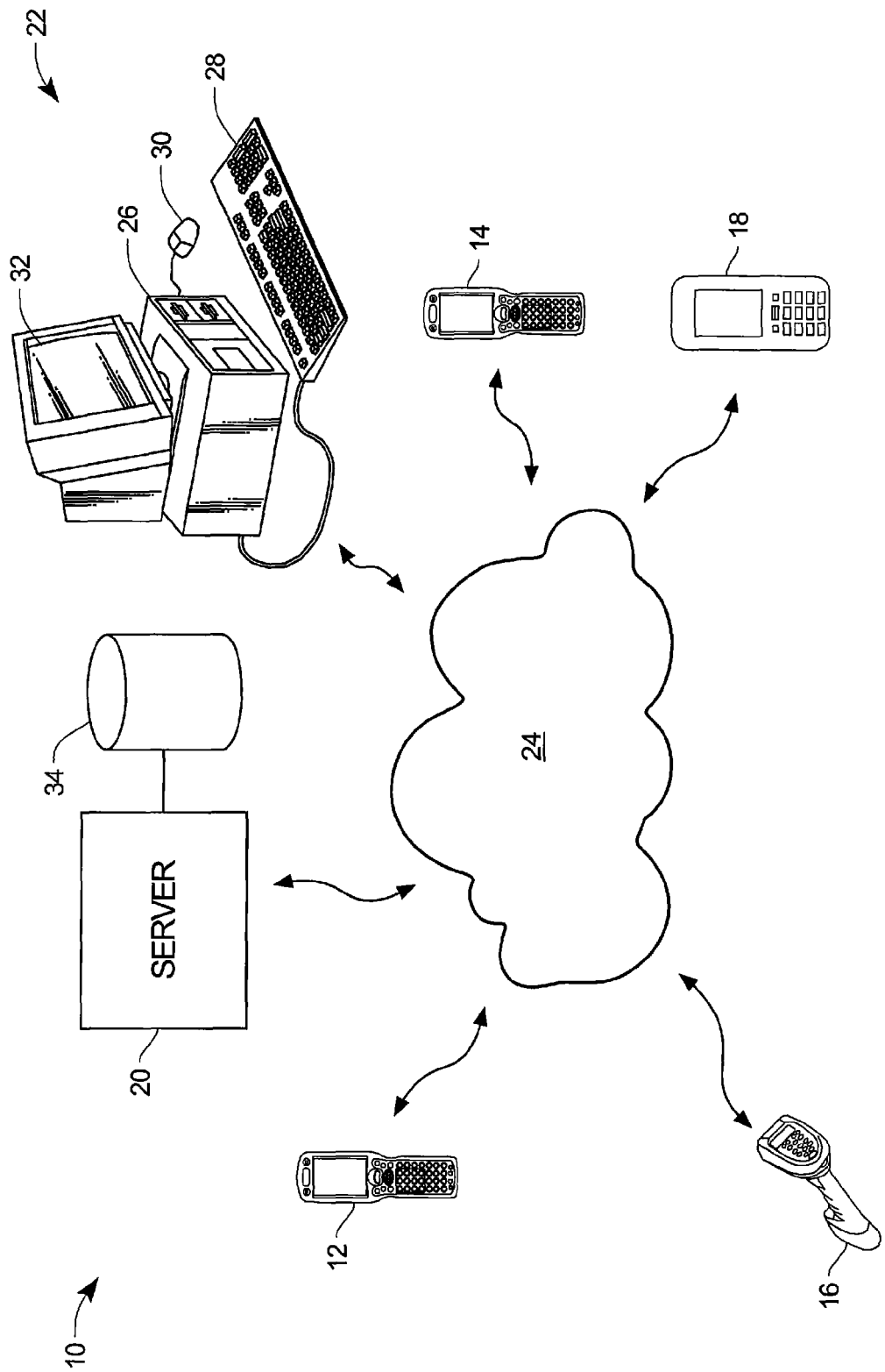
FIG. 1 is a diagram of a system of remote devices in communication with a server and a remote device management terminal in accordance with at least one embodiment of the present invention.

It will be appreciated that for purposes of clarity and where deemed appropriate, reference numerals have been repeated in the figures to indicate corresponding features.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art.

Referring to FIG. 1, a diagram 10 of a system of remote devices 12, 14, 16, and 18 in communication with a server 20 and a remote device management terminal 22 through a Wide Area Network (WAN) 24 in accordance with at least one embodiment of the present invention is shown. Those skilled in the art will understand that the WAN 24 may comprise the internet, cellular phone communication, other RF communication systems, etc. and combinations thereof. The remote device management terminal 22 includes a data processing unit 26, a keyboard 28, a pointing device 30 with at least two buttons for left and right clicks, and a display 32. The server 20 may have connected thereto a data storage module 34.

The remote devices 12-16 are data collection devices (DCDs) which may be portable data terminals (PDTs), portable data assistants (PDAs), etc. Data collection devices are a class of devices used to collect, process, and transfer data to a data processing system.

In operation, the remote devices 12-16 have the ability to monitor the operation of the respective devices and to provide device status and performance information to the central office as described in U.S. Patent Publication No. 2008/0185432 A1. The server 20 receives the data from remote devices, such as the remote devices 12-16 and provides configuration update information to the remote devices. The terminal 22 interacts with the server 20 to provide interface screens on the display 32 allowing a user of the remote devices to locate each remote device, determine the configuration of each remote device, analyze the performance of the remote devices, and send updated configuration information to the remote devices as necessary. The server 20 may also have error detection and configuration software, stored in a hard drive in the data processing unit 26 or the data storage module 34, which operates independently of the interface screens on the display 32.

Figure 2A:
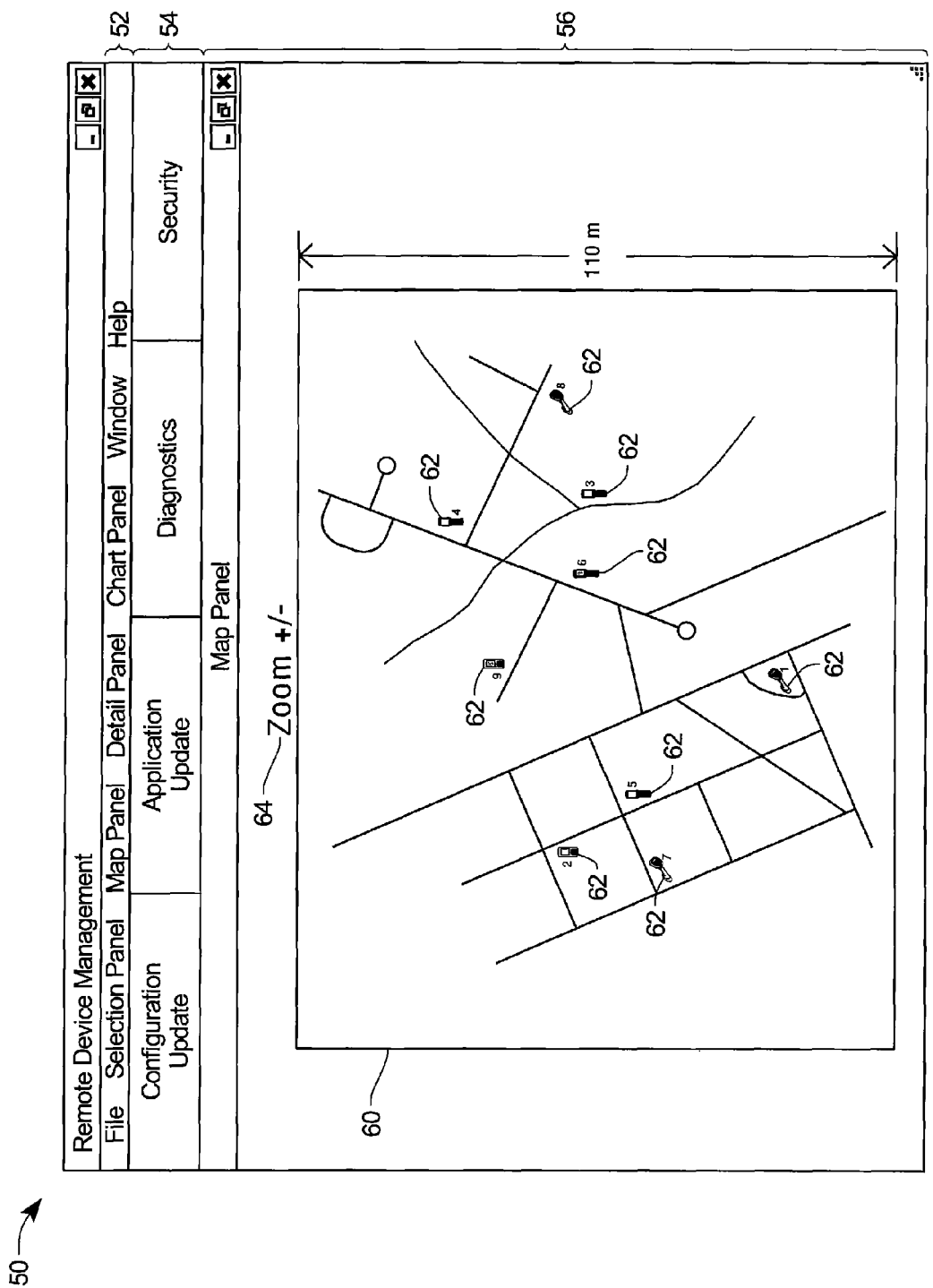

FIG. 2A is one embodiment of a user interface screen 50, in the form of a Graphical User Interface (GUI), which might be shown on the display 32. The screen has a title "Remote Device Management" and has three main sections: a menu section 52, which has drop down lists (File, Selection Panel, Map Panel, Detail Panel, Window, and Help) for configuring the screen 50, a remote device interaction menu section 54 which has drop down lists (Configuration Update, Application Update, Diagnostics, and Security) for updating or querying one or more remote devices such as the remote devices 12-16, and a graphical presentation section 56 for providing graphical information that a user can view and manipulate.

FIG. 2A shows a map 60 of a geographical region with remote devices indicated by icons 62 (each associated with a number 1-9 in the map 60) representing the types of remote devices, some of which are colored (numbers 1, 6, 8, and 9) to indicate configuration information about the devices. A user can select the type of icon which represent different configuration information, the color, and other variables which may make up each icon using the "Map Panel" button in the menu section 52. Complete configuration information for each of the remote devices may be stored in the data storage module 34. The location of each remote device may be determined from the longitude and latitude detected by each remote device using an internal GPS module and sent to the server 20. A user can zoom in on sections of the map using a zoom control 64, and the area covered in the map is indicated by a scale on the right side of the map 60.

Figure 2B:
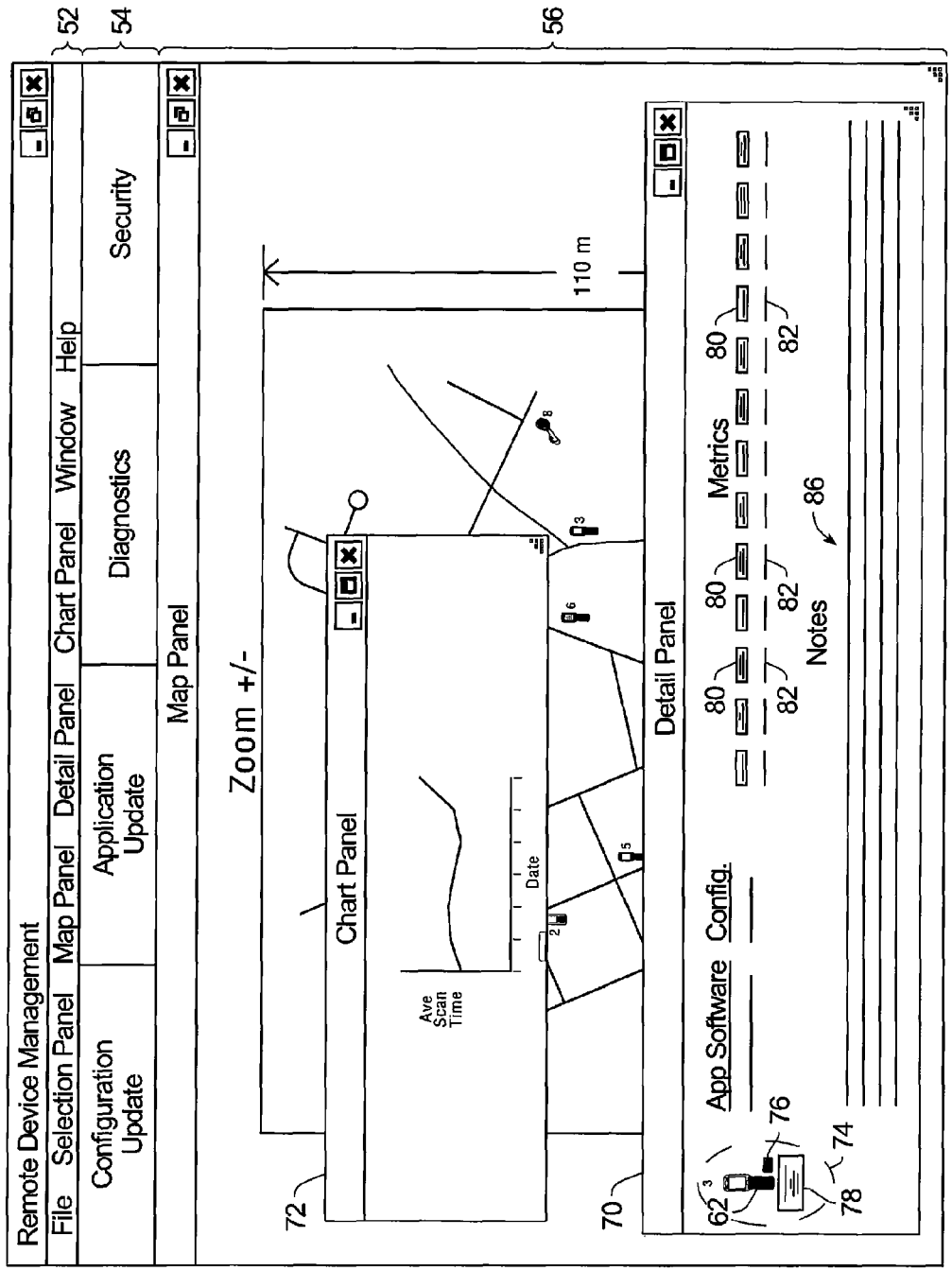

In one embodiment of the present invention a double left click on the pointing device 30 with the pointing device arrow over an icon, for example the icon of remote device numbered 3, causes a detail panel window 70 and a chart panel window 72 to pop up as shown in FIG. 2B. The detail window 70 may have an icon grouping 74 representing the particular remote device 62 with the same number as that shown in the map. Each grouping 74 may also include the icon 62 representing the type of device and icon 76 representing the type of symbology that the particular remote device is configured to recognize along with more configuration information in a configuration box 78 below the icon 62. For example a camera icon 76 may indicate a remote device with a picture taking capability. The application software (App Software) which is used in the remote device may be shown along with the software configuration (Config.). In addition, a list of the monitored data, labeled "Metrics" in FIG. 2B, that has been sent to the server 30 may be shown. Each metric may be described in a box 80 with the current value on a line 82 for the metric shown below each box 80. There may also be a section 86 for the user to enter notes on the selected device.

The chart panel 72 is shown with a graph of the average scan time versus time which the selected remote device has reported which is data of one of the metrics 80 shown in the detail panel. The data contained in both the detail panel 70 and the chart panel 72 can be customized using the Detail Panel button and the Chart Panel button, respectively, in the menu section 52. Each of the panels, which includes the map panel, the detail panel, the chart panel, and the selection panel in the embodiment shown in the drawings, can be moved, sized, enabled, disabled, and hidden by the user.

Figure 2C:
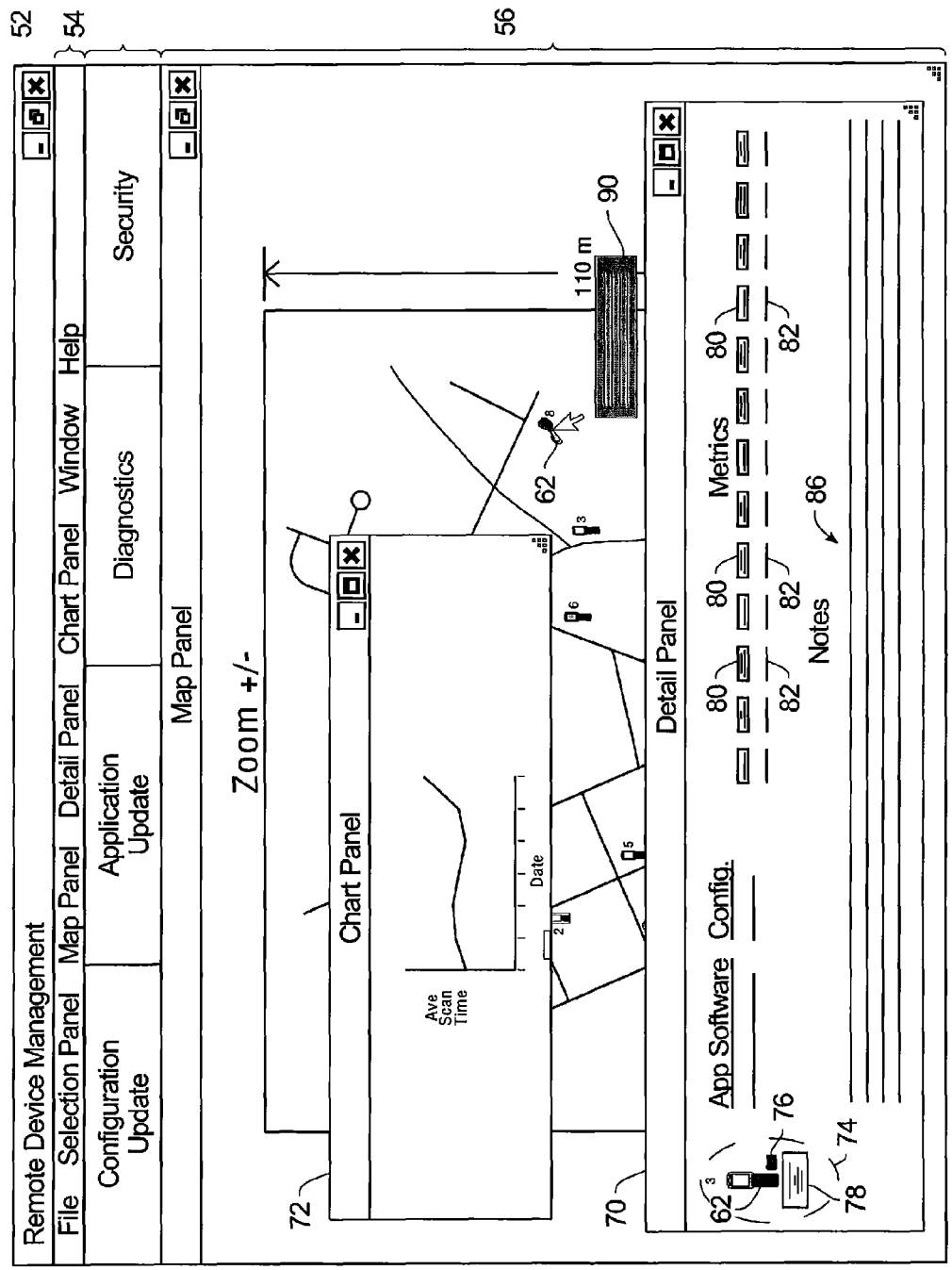

FIG. 2C is FIG. 2B in which the arrow controlled by the pointing device 30 is hovering over the icon 62 for remote device number 8. A box 90 containing configuration information is produced to allow a user to quickly determine more detailed configuration information about the remote device.

Figure 2D:
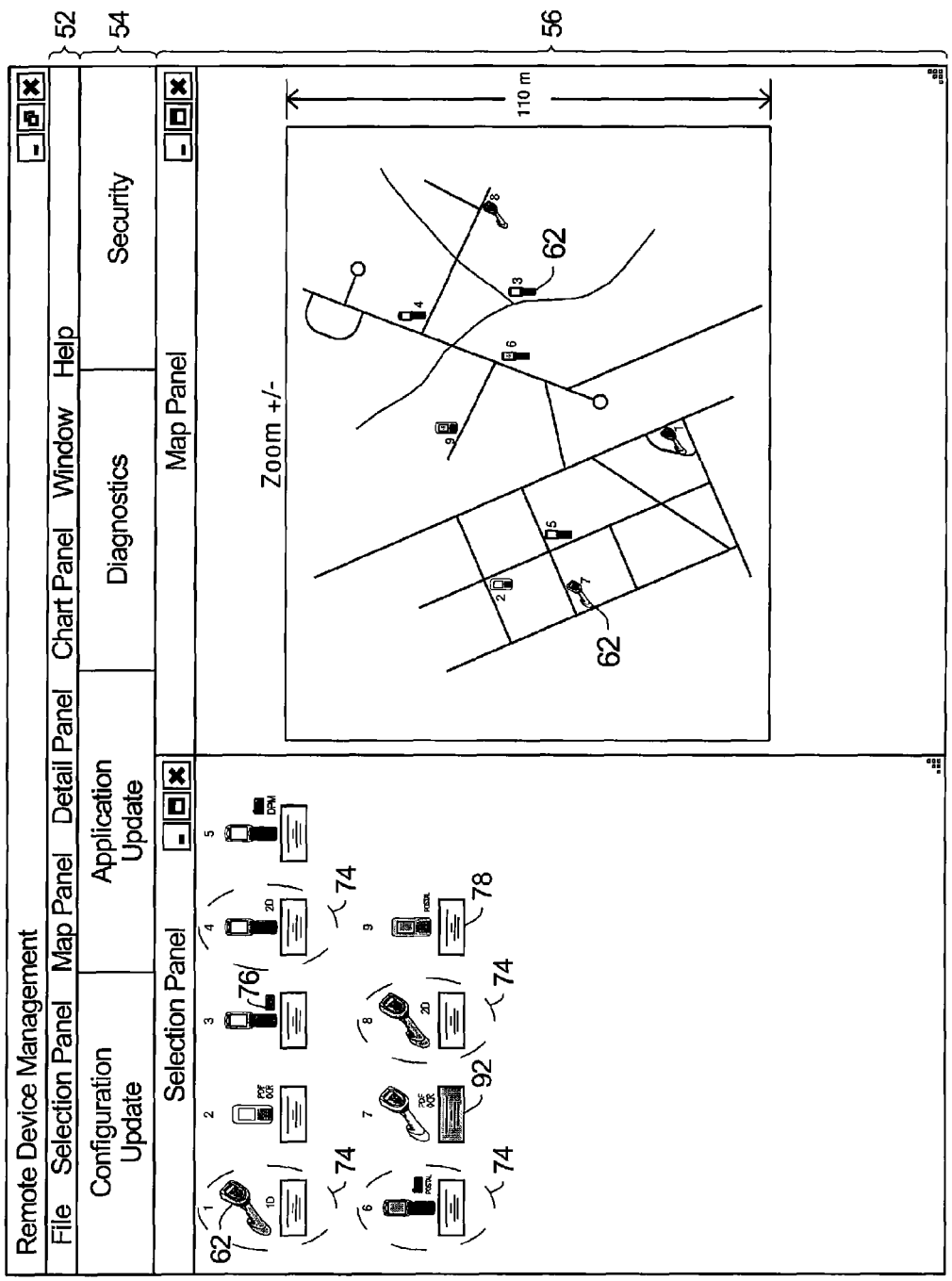

FIG. 2D is another configuration of the user interface screen which has a selection panel on the left side and the map panel on the right side, The selection panel may have icon groupings 74 for each of the remote devices shown in the map panel. Each icon grouping 74 may have the combination of icons 62 and 76 and configuration information box 78 shown in the left side of the detail panel shown in FIG. 2B. The hover and double click capabilities of the pointing device with regard to the map panel also apply to the selection panel. A configuration box 92 may have colored text indicating a particular type of configuration. The colored text in the configuration box 92 allows the user to quickly identify remote devices 62 that have a particular configuration.

Figure 2E:
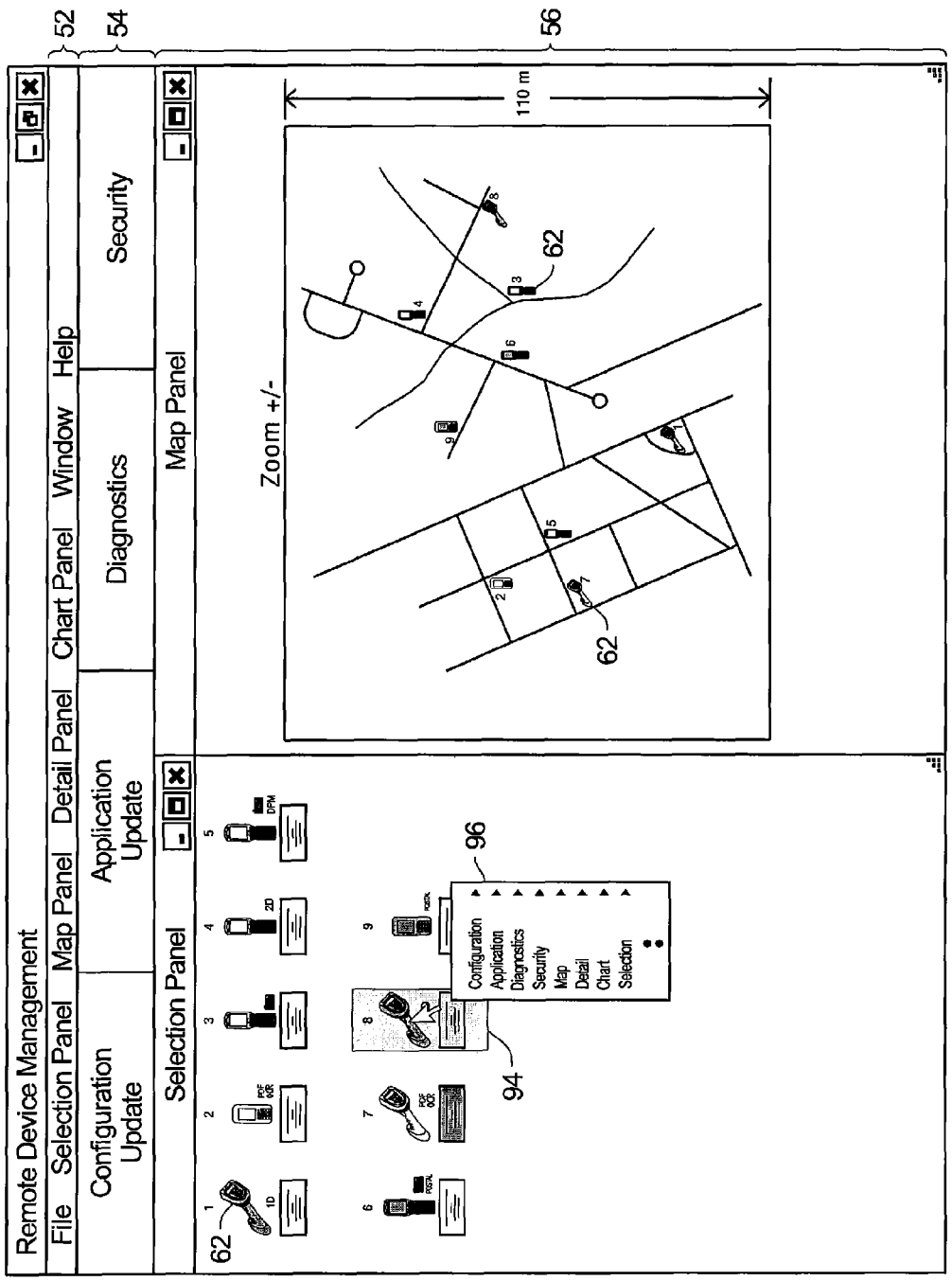

FIG. 2E is FIG. 2D after a right click of the pointing device 30 on the icon in the selection box representing the number 8 remote device. A box 94 may be formed around the device number 8 icon and a selection box 96 is presented to the user. Hovering the pointing device over any of the items listed in the selection box 96 may cause a further list (not shown) of choices for the user. In the embodiment shown in FIG. 2E the first four items, Configuration, Application, Diagnostics, and Security, may provide the same items as clicking the respective boxes in the menu section 54. The four items Selection, Map, Detail, and Chart may provide the same options as clicking each of the corresponding items in the menu section 52. Additional items, indicated by the vertical bullets, may be included in the selection box 96. These additional items may be commands to the selected remote devices to send certain data to the server 20 so that the data would be available to the user for further analysis and comparison.

Figure 2F:
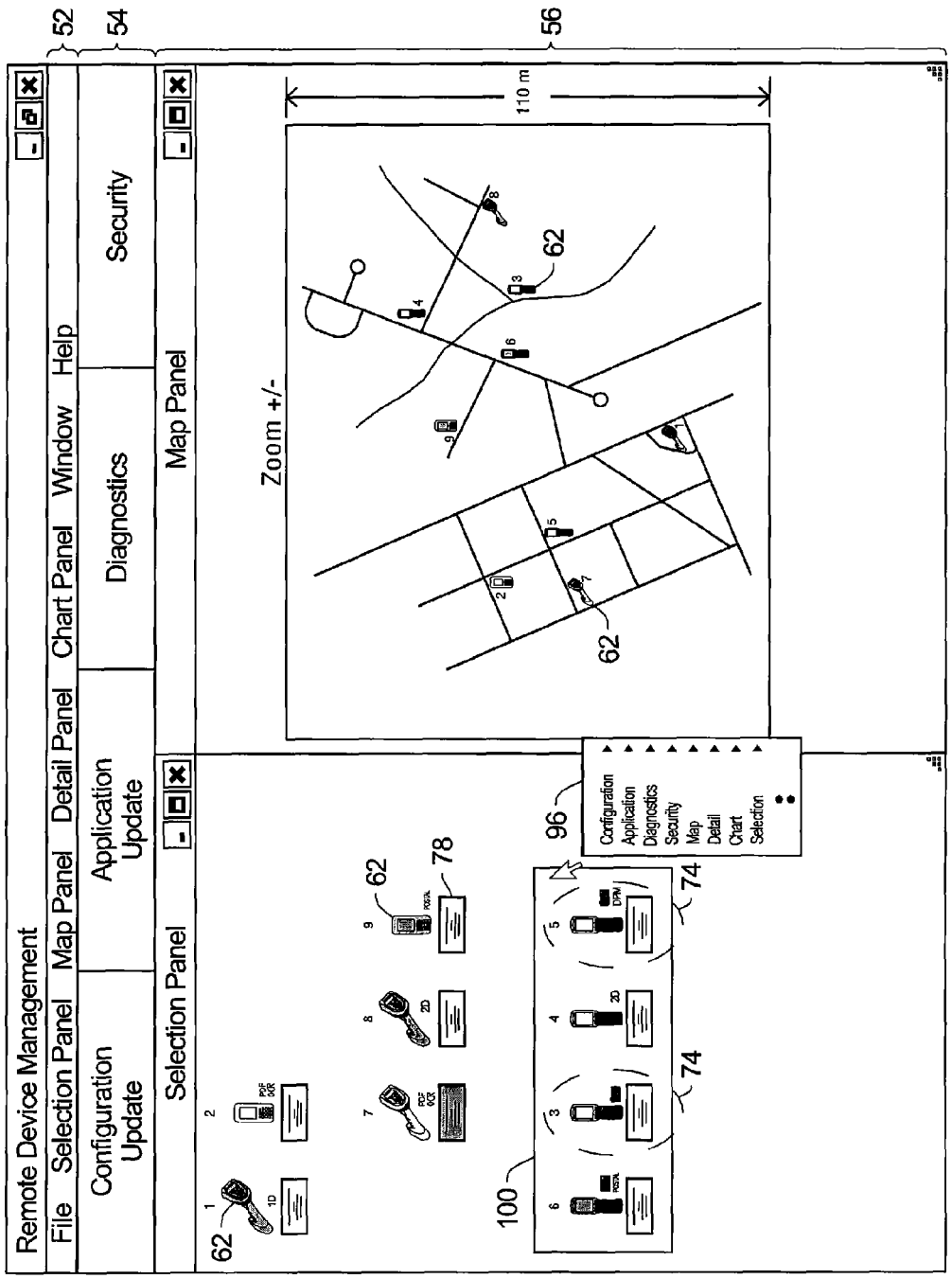

FIG. 2F is FIG. 2D after four of the remote device icons have been dragged to a new position in the selection pane, a box 100 drawn around the four icons using the pointing device 30, and the selection box 96 made to appear by a right click on the pointing device 30 inside the box 84 away from any of the icon groups 74. By dragging selected icons corresponding to selected remote devices to one region, drawing a box around the selected icons, and right clicking on the box 100 a user can perform the same operation on several remote devices at once. For example, all of the devices within the box 100 can be upgraded with a new configuration by a user using the user interface screen shown in FIG. 2F. Hovering over an area of the box that is not filed with icon grouping 74 may bring up a configuration box which shows only the configuration parameters that are common to all of the remote devices inside the box. Thus, in FIG. 2F, hovering over an area of the box 100 that is not occupied by one of icon groupings 74 will produce a configuration box showing the common model numbers of the remote devices 3, 4, 5, and 6 if they are the same models, plus any other common configuration parameters.

Figure 2G:
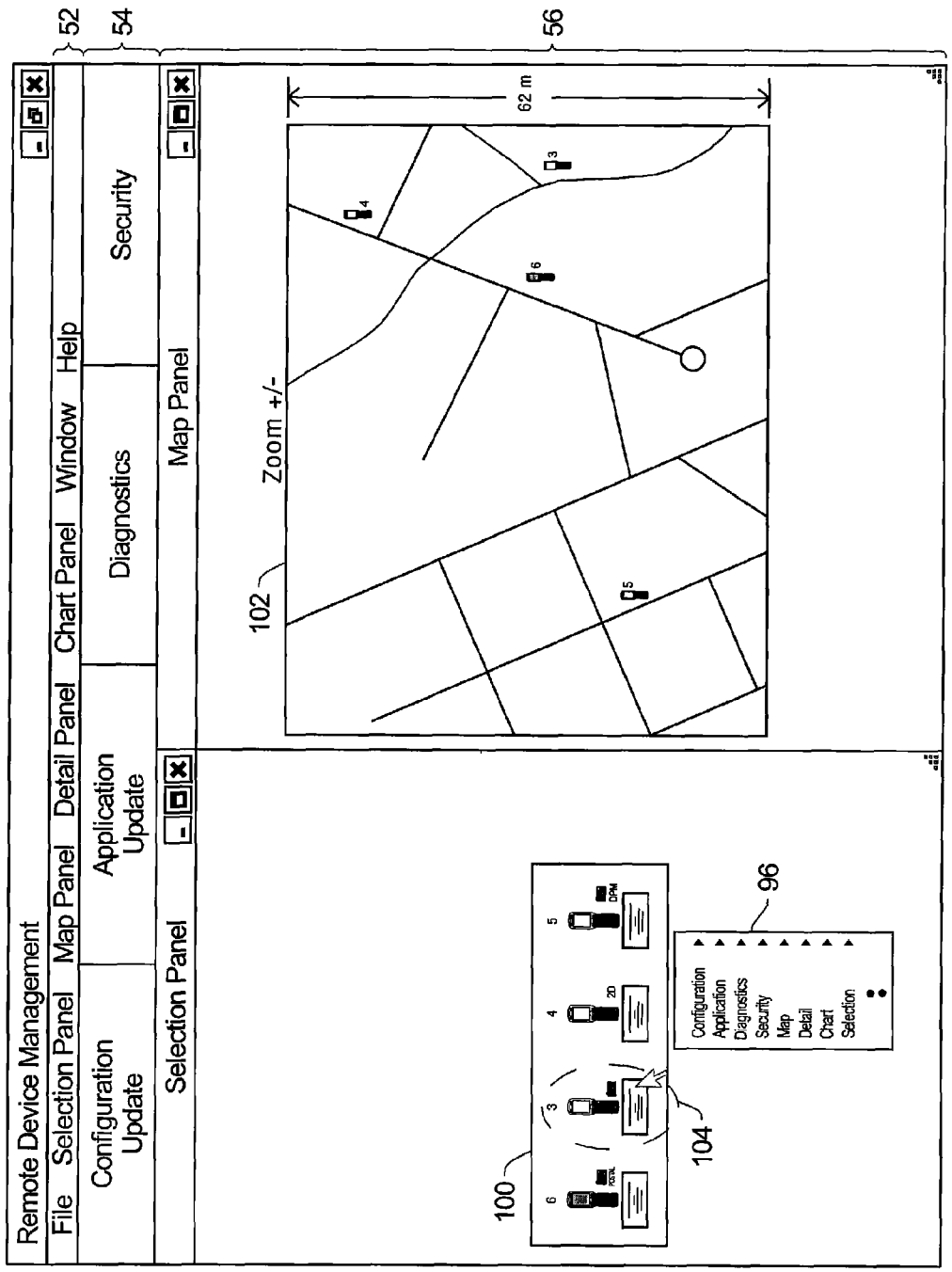

FIG. 2G is FIG. 2F after the user has expanded a section around a selected location in the map 60 to form a more detailed map 102. The user has also elected to hide the remote devices other than the four remote devices inside the box 100 in both the selection panel and the map panel. Also, one of the icon groupings, 104, has been right clicked which brings up the selection box 96. In the embodiment shown in FIG. 2G, by using the selection box 96 the remote device represented by the icon grouping 104 may be updated by changing the application in the remote device or by changing the configuration of the remote device.

Figure 2H:
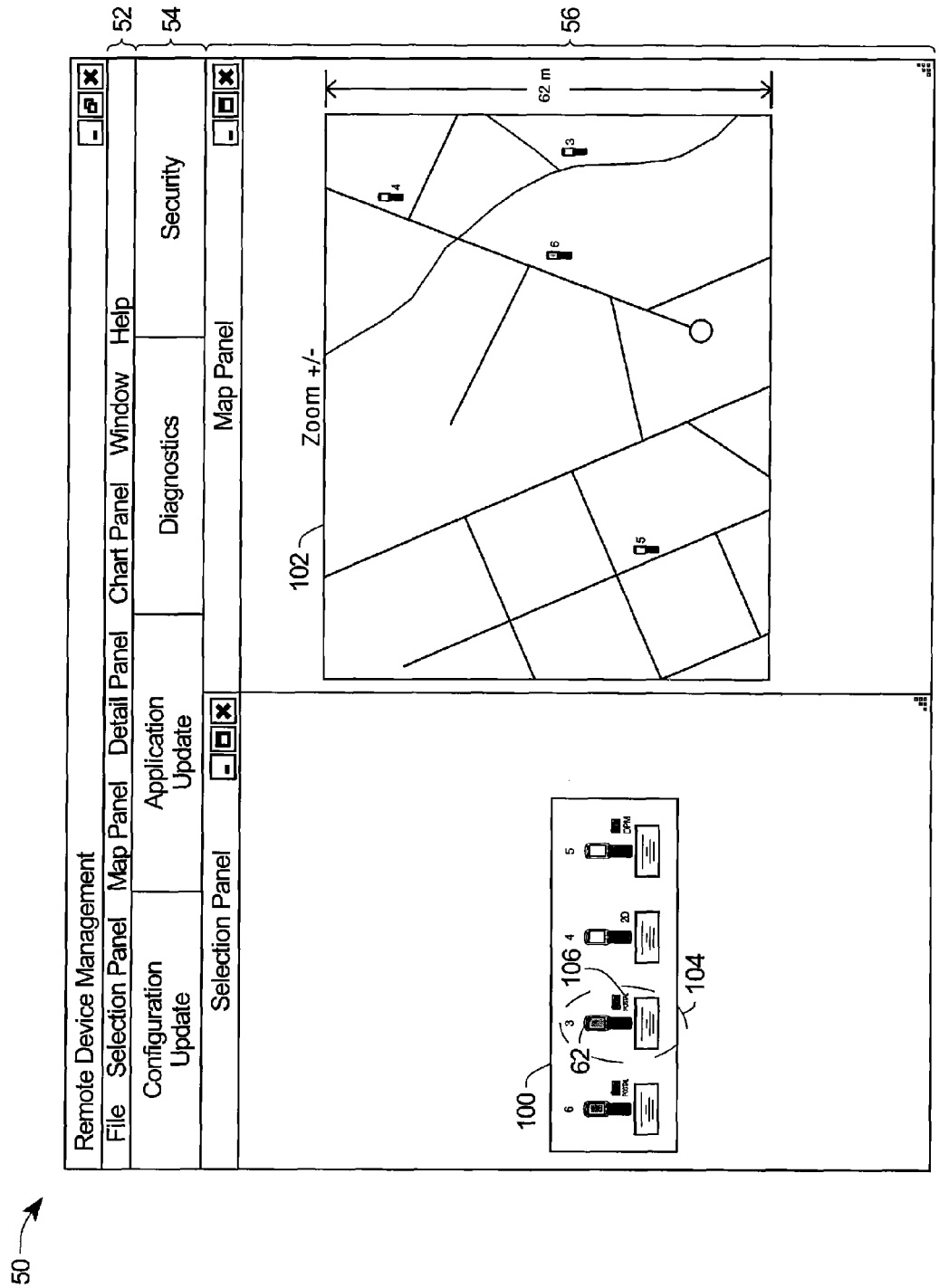
Figure 21:
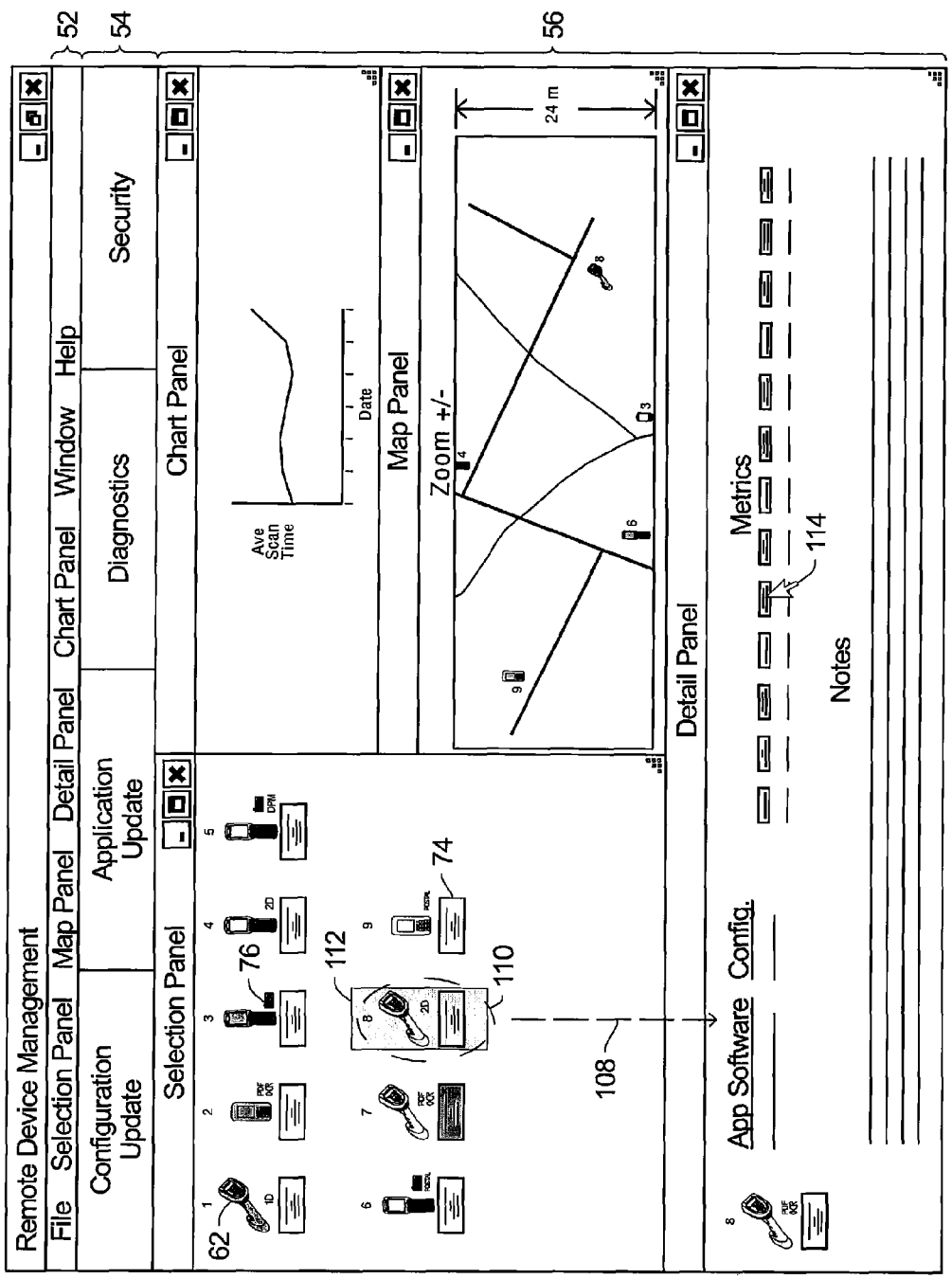

FIG. 2H is FIG. 2G after the remote device represented by icon grouping 104 has been updated which may result in displaying the remote device icon 62 in a new color thus confirming the update. Also, another icon 106 has been added to the remote device icon 104 in FIG. 2H indicating that the remote device now has the ability to interpret postal code symbols.

FIG. 2I shows the process of dragging an icon from the selection panel to the detail panel, as indicated by dashed line 108. A single left click may highlight the icon group 110 and the associated information with a box 112, and the box can be dragged into the detail panel. The transfer into the detail panel leaves the icon group 74 in the selection panel in one embodiment of the present invention. Also, by double left clicking on one of the metrics, as indicated by arrow 114, causes a plot of the metric value for a predetermined number of dates to be presented in the chart panel.

When the remote device manager interface screen is closed, the last screen and the setting in the selection, map, detail, and chart panels are saved and restored to the user when the interface screen is brought up the next time.

The user interface screens shown in FIGS. 2A-2I allow a user to address configuration issues by providing a graphical configuration tool. In addition, new devices introduced into the system can be quickly identified and brought into a desired configuration using the graphical user interfaces described above.

Figure 3:
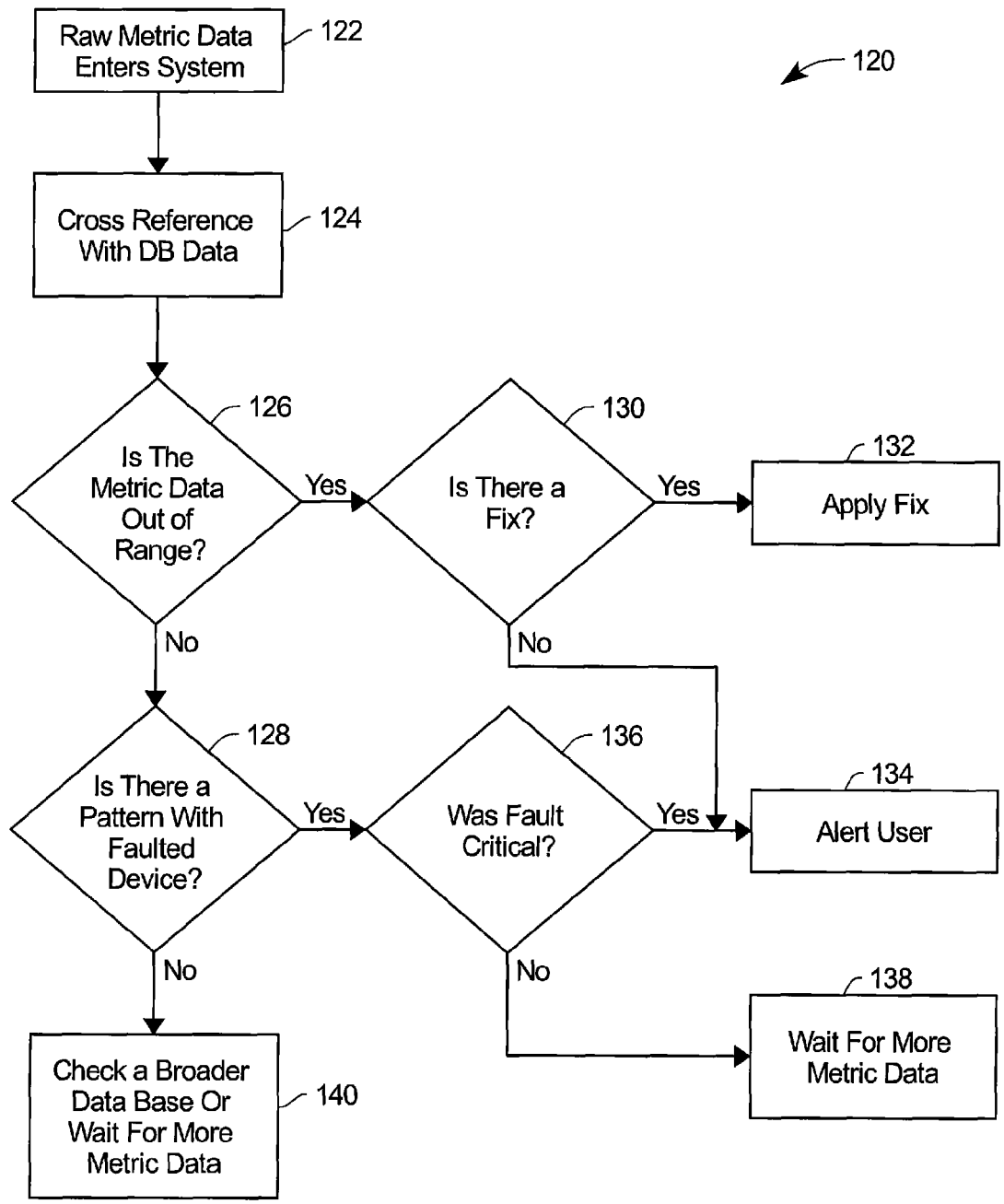
FIG. 3 is a flow chart of a method for recognizing a problem with one of the remote devices shown in FIG. 1, and resolving the problem, if possible, using data received from other remote devices.

FIG. 3 is a flow chart 120 showing a process for identifying faults or potential faults in the remote devices 62. The server 20 receives raw metric data which enter the system as indicated by box 122. Such metrics may include CPU load, scan times, and the other monitored events listed in U.S.

Patent Publication 2008/0185432. The raw metric data can be sent to the server automatically or can be sent to the server as a result of a request for information by the server 20. The server 20 will cross reference the new data with specifications for the acceptable range of the metric data stored in the data storage module 34 to determine if a new metric is out of tolerance, and may also compare the new metric data with previous data to determine if the new metric data deviates significantly from the mean of the previous metric data for the same type and configuration of remote device 62 as indicated by boxes 124 and 126.

If the metric data is out of range, in that it is out or tolerance or deviates significantly from the mean of previous metric data, or in case of a notification from a remote device of an error or device fault, the server 20 would try to correlate this data with previous data to determine if the fault has previously occurred as indicated by box 128. In both cases the system would also attempt to find a correlation between the device with the issue and the device model, revision, installed software, etc. of other devices. In this way it would not only detect a problem, but detect precisely what other devices may have the same issue and, therefore, automatically update those devices. In the correlation process, indicated by box 128, the system will also attempt to make correlations between a metric that is out of range and devices that had the same or similar out of range condition, thus being able to anticipate if a system is likely to have a problem. The events that it would compare would not be limited to faults or out of tolerance metrics as even data that seems okay could be a predictor of an issue. As the database grows and its mesh of event correlations grows, the system would be increasingly effective at predicting issues.

If the metric data is out of range by the test described above and indicated in box 126, the server 20 determines if a fix is available for the out of range condition as indicated by box 130. If a fix is available, the fix is applied as indicated in box 132. If a fix is not available, a user is alerted as indicated in box 134. Here the term "user" refers to either the operator of the remote device or a person in charge of the remote devices 62, or both.

If it is determined that there is a pattern with the faulted device, the device that has a metric that is out of range, in the test indicated in boxes 126 and 128, then a determination is made whether the fault is critical as indicated in box 136. If the fault is critical, then the user is alerted as indicated by box 134, and if the fault is not critical, the server will wait for more metric data as indicated in box 138 by returning to receive new raw metric data indicated by box 122. If it is determined that there is not a pattern with the faulted device in box 128, then a check is made using a broader data base, such as a data base made available from a manufacturer of the particular remote device, or wait for more metric data as indicated in box 140 by returning to receive new raw metric data indicated by box 122.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A process to manage remote devices that are mobile data collection devices, each individually configurable to have selected operating characteristics, wherein the operating characteristics comprise decoding at least one type of symbology, and wherein the remote devices comprise an internal GPS module, comprising:

providing a network having a server in communication with a plurality of remote devices of different types of mobile data collection devices, wherein each remote device of the plurality of remote devices is a mobile data collection device that is configurable by receiving one or more software updates from the server;

providing a user interface, the user interface comprising a map of a geographical region in which one or more remote devices of the plurality of remote devices are located;

placing, for each remote device of the one or more remote devices, a respective icon representative of the respective remote device on the map at a location on the map that corresponds to a location of the remote device in the geographical region the location determined at least in part based upon longitude and latitude data obtained from the remote device, wherein a common icon type is used for remote devices of a same type;

adjusting, for each icon placed on the map, a graphical characteristic of the respective icon to indicate a current configuration status for the remote device represented by the icon, the current configuration status determined based on performance data obtained from the remote device about performance of the remote device, wherein the performance data comprises data representative of time for the remote device to decode postal code symbology, and wherein the obtained performance data is cross-referenced to one or more specifications indicating one or more ranges for the performance data in order to determine whether the performance data is within specification and assess the current configuration status of the remote device, and wherein the current configuration status is determined based further on application of an update to the remote device based on the performance data being out of specification;

adjusting, for each icon placed on the map, the location of the respective icon to indicate a current location of the remote device, the current location determined at least in part based upon longitude and latitude data obtained from the remote device;

updating remote devices represented by icons to extend decoding capability to a different or additional symbology, performing at least one of adding another icon or modifying an icon of the at least one additional icon to indicate the extended decoding capability;

determining that the update addresses a fault indicated by the performance data being out of specification, determining that the update is available, and applying the update in response to the update being available, wherein the current configuration status indicated by the adjusting of the graphical characteristic of the respective icon reflects the applied update;

based on determining a correlation between the remote device and at least one other remote device of the plurality of remote devices, the correlation indicating that the at least one other remote device is likely to exhibit the fault, automatically applying another update to the at least one other remote device.

2. The process of 1, further comprising, based on selection of an icon on the map, displaying current data collected using the remote device represented by the selected icon, and displaying configuration data for the remote device represented by the selected icon.

3. The process of 1, further comprising displaying, on the map, icons of all remote devices, of the one of more remote devices, which are of a selected type, and hiding, on the map, icons of all remote devices, of the one or more remote devices, which are of a type other than the selected type.

4. The process of 3, further comprising, based on selection of an icon on the map, displaying current data collected using the remote device represented by the selected icon, and displaying configuration data for the remote device represented by the selected icon.

5. The process of 1, further comprising providing a selection panel of the user interface, the selection panel comprising multiple icon groupings, each icon grouping corresponding to a respective icon placed on the map, wherein an icon grouping comprises a device icon for the remote device represented by the icon, on the map, to which the icon grouping corresponds and further comprises at least one additional icon representative of at least one characteristic of the remote device represented by the icon, on the map, to which the icon grouping corresponds.

6. The process of 5, further comprising:
dragging and dropping selected icon groupings of the multiple icon groupings to an area of the selection panel;
enclosing the area of the selection panel in a boundary, wherein the enclosing encloses the selected icon groupings within the boundary;
applying a common software update to each of the remote devices represented by the icons, on the map, to which the icon groupings enclosed within the boundary correspond;
and
selecting an icon grouping of the icon groupings enclosed within the boundary and updating the remote device, represented by the icon, on the map, to which the selected icon grouping corresponds, with individual updates for that remote device.

7. The process of claim 1, wherein based on the performance data being out of specification, application of the update is withheld pending collection of further performance data, wherein the current configuration status is determined based further on collection of the further performance data.

8. The network of 10, wherein the method further comprises providing a selection panel of the user interface, the selection panel comprising multiple icon groupings, each icon grouping corresponding to a respective icon placed on the map, wherein an icon grouping comprises a device icon for the remote device represented by the icon, on the map, to which the icon grouping corresponds and further comprises at least one additional icon representative of at least one characteristic of the remote device represented by the icon, on the map, to which the icon grouping corresponds.

9. The network of 8, wherein the method further comprises, based on dragging and dropping selected icon groupings of the multiple icon groupings to an area of the selection panel, and based on enclosing the area of the selection panel in a boundary, wherein the enclosing encloses the selected icon groupings within the boundary, applying a group software update to each of the remote devices represented by the icons, on the map, to which the icon groupings enclosed within the boundary correspond.

10. A network for remotely managing a plurality of remote devices that are mobile data collection devices, each individually configurable to have selected operating characteristics, wherein the operating characteristics comprise decoding at least one type of symbology, and wherein the remote devices comprise an internal GPS module, the network comprising:
a server in communication with the plurality of remote devices that are mobile data collection devices; and
a data processing system in communication with a display, wherein the data processing system is configured to perform a method comprising:
providing a user interface, the user interface comprising a map of a geographical region in which one or more remote devices of the plurality of remote devices are located;
assigning a common icon type for each remote device of a same type, and placing for each remote device of the one or more remote devices, a respective icon representative of the respective remote device on the map at a location on the map that corresponds to a location of the remote device in the geographical region the location determined at least in part based upon longitude and latitude data obtained from the remote device, wherein the common icon type is used for icons representative of remote devices of the same type;
adjusting, for each icon placed on the map, a graphical characteristic of the respective icon to indicate a current configuration status for the remote device represented by the icon, the current configuration status determined based on performance data obtained from the remote device about performance of the remote device, wherein the performance data comprises data representative of time for the remote device to decode postal code symbology, and wherein the obtained performance data is cross-referenced to one or more specifications indicating one or more ranges for the performance data in order to determine whether the performance data is within specification and assess the current configuration status of the remote device, and wherein the current configuration status is determined based further on application of an update to the remote device based on the performance data being out of specification;
adjusting, for each icon placed on the map, the location of the respective icon to indicate a current location of the remote device, the current location determined at least in part based upon longitude and latitude data obtained from the remote device;
updating remote devices represented by icons to extend decoding capability to a different or additional symbology, performing at least one of adding another icon or modifying an icon of the at least one additional icon to indicate the extended decoding capability;
determining that the update addresses a fault indicated by the performance data being out of specification, determining that the update is available, and applying the update in response to the update being available, wherein the current configuration status indicated by the adjusting of the graphical characteristic of the respective icon reflects the applied update;
based on determining a correlation between the remote device and at least one other remote device of the plurality of remote devices, the correlation indicating that the at least one other remote device is likely to exhibit the fault, automatically applying another update to the at least one other remote device.

11. The network of 10, wherein the method further comprises, based on selection of an icon on the map, displaying current data collected using the remote device represented by the selected icon, and displaying configuration data for the remote device represented by the selected icon.

12. The network of 10, wherein the method further comprises displaying, on the map, icons of all remote devices, of the one or more remote devices, which are of a selected type, and hiding, on the map, icons of all remote devices, of the one or more remote devices, which are of a type other than the selected type.

13. The network of 12, wherein the method further comprises, based on selection of an icon on the map, displaying current data collected using the remote device represented by the selected icon, and displaying configuration data for the remote device represented by the selected icon.

\* \* \* \* \*